US006221545B1

(12) United States Patent
Tran et al.

(10) Patent No.: US 6,221,545 B1
(45) Date of Patent: Apr. 24, 2001

(54) ADHESIVES FOR PREPARING A MULTILAYER LAMINATE FEATURING AN INK-BEARING SURFACE BONDED TO A SECOND SURFACE

(75) Inventors: Bao Tran, Saint Paul; Minyu Li, Oakdale; Eric D. Morrison, Saint Paul; Claire A. Jalbert, Buffalo; Jai Venkateson, Norwalk; James A. Baker, Hudson; Gay L. Herman, Cottage Grove, all of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/392,903

(22) Filed: Sep. 9, 1999

(51) Int. Cl.$^7$ .............................. G03G 13/22; B32B 7/04
(52) U.S. Cl. .................................. 430/10; 283/81; 283/94
(58) Field of Search .......................... 430/10, 14; 283/81, 283/94

(56) References Cited

U.S. PATENT DOCUMENTS

| | | | |
|---|---|---|---|
| 3,967,400 | 7/1976 | Otto | 283/111 |
| 3,976,373 | 8/1976 | Kawakubo et al. | 355/10 |
| 4,006,050 | 2/1977 | Hurst et al. | 156/234 |
| 4,026,642 | 5/1977 | Tanaka et al. | 355/1 |
| 4,088,216 | 5/1978 | LaManna et al. | 400/130 |
| 4,097,279 | 6/1978 | Whitehead | 96/27 R |
| 4,100,011 | 7/1978 | Foote | 156/272 |
| 4,101,701 | 7/1978 | Gordon | 428/189 |
| 4,133,926 | 1/1979 | Vorrier et al. | 428/200 |
| 4,234,644 | 11/1980 | Blake et al. | 428/204 |
| 4,259,391 | 3/1981 | Brecht | 428/195 |
| 4,287,285 | 9/1981 | Mosehauer | 430/124 |
| 4,304,809 | 12/1981 | Moraw et al. | 428/195 |
| 4,313,984 | 2/1982 | Moraw et al. | 428/13 |
| 4,315,980 | 2/1982 | Sadamatsu et al. | 430/58 |
| 4,318,554 | 3/1982 | Anderson et al. | 283/7 |
| 4,324,421 | 4/1982 | Moraw et al. | 283/7 |
| 4,381,329 | 4/1983 | Dallmann et al. | 428/204 |
| 4,389,472 | 6/1983 | Neuhaus et al. | 430/10 |
| 4,425,421 | 1/1984 | Rutges et al. | 430/238 |
| 4,429,015 | 1/1984 | Sheptak | 428/201 |
| 4,441,945 | 4/1984 | Moraw et al. | 156/108 |
| 4,450,024 | 5/1984 | Haghiri-Tehrani et al. | 156/108 |
| 4,455,359 | 6/1984 | Pätzold et al. | 430/10 |
| 4,456,639 | 6/1984 | Drower et al. | 428/13 |
| 4,456,667 | 6/1984 | Bochow et al. | 430/10 |
| 4,463,971 | 8/1984 | Hoppe et al. | 283/83 |
| 4,467,335 | 8/1984 | Schmidt et al. | 346/160 |
| 4,469,353 | 9/1984 | Anarwala | 283/74 |
| 4,479,996 | 10/1984 | Schäfer et al. | 428/212 |
| 4,497,872 | 2/1985 | Hoppe et al. | 428/483 |
| 4,520,063 | 5/1985 | Simon et al. | 428/195 |
| 4,522,670 | 6/1985 | Caines | 156/220 |
| 4,536,013 | 8/1985 | Haghiri-Therani et al. | 283/77 |
| 4,542,288 | 9/1985 | Drexler | 235/487 |
| 4,544,181 | 10/1985 | Maurer et al. | 283/74 |
| 4,552,383 | 11/1985 | Hoppe et al. | 283/83 |
| 4,560,426 | 12/1985 | Moraw et al. | 156/64 |
| 4,579,371 | 4/1986 | Long et al. | 283/83 |
| 4,592,976 | 6/1986 | Whitehead | 430/10 |

(List continued on next page.)

FOREIGN PATENT DOCUMENTS

| | | |
|---|---|---|
| 2163943 | 7/1972 | (DE) . |
| 2401996 | 7/1974 | (DE) . |
| 3137275 | 3/1987 | (DE) . |
| 3614661 | 7/1987 | (DE) . |
| 4307038 | 9/1994 | (DE) . |
| 0086282 | 8/1983 | (EP) . |
| 0195104 | 9/1986 | (EP) . |
| 0294665 | 12/1988 | (EP) . |
| 0443626 | 8/1991 | (EP) . |
| 0601760 | 6/1994 | (EP) . |
| 0871079A1 | 10/1998 | (EP) . |
| 2013505 | 2/1990 | (ES) . |
| 2027871 | 2/1995 | (ES) . |

(List continued on next page.)

OTHER PUBLICATIONS

PCT Search Report, dated Jan. 12, 2000; Int'l Appln. No PCT/US99/20741.
PCT Search Report, dated Jan. 12, 2000; Int'l Appln. No. PCT/US99/20611.
PCT Search Report; dated Jan. 12, 2000; Int'l Appln. No. PCT/US99/20743.
PCT Search Report; dated Jan. 26, 2000; Int'l Appln. No. PCT/US99/20688.
Database WPI; Derwent Publications Ltd., XP–002126564, Jan. 18, 1994 (Abstract).
Database WPI; Derwent Publications Ltd., XP–002126570; Sep. 10, 1992 (Abstract).
Database WPI; Derwent Publications Ltd., XP–002126465; Mar. 25, 1997 (Abstract).
Database WPI; Derwent Publications Ltd., XP–002126466; Jun. 25, 1981 (Abstract).
Andrews, E.H., et al., "Adhesion to Skin, Part 1 Peel tests with hard and soft machines", *J. Mat. Sci.* 20:3621–3630 (1985).
Webpage: FARGO–HDP710/HDP720 Highlights, "Product Features, Introducing the New HDP710 and HDP720– A New Definition of Card Printing", http://www.fargo.com/hdp/features.html, Aug. 20, 1999; pp. 1–5.
Webpage: FARGO–Making Cards; Everything you need to know about making cards—in 10 minutes or less!http://www.fargo.com/making cards/making.right.html Aug. 20,1999; pp. 1–10.

(List continued on next page.)

Primary Examiner—John Goodrow

(57) ABSTRACT

An adhesive composition that includes the reaction product of (a) a polyester-based polyurethane; (b) an epoxy resin; (c) an epoxy-functional silane; and (d) an isocyanate-functional compound, and multilayer laminates in which this adhesive composition is used to bond two polymeric substrates together where at least one of the substrates has an ink-bearing surface.

18 Claims, No Drawings

U.S. PATENT DOCUMENTS

| | | | |
|---|---|---|---|
| 4,617,216 | 10/1986 | Haghiri-Tehrani et al. | 428/67 |
| 4,629,306 | 12/1986 | Warwick | 355/3 R |
| 4,648,188 | 3/1987 | Blair | 40/538 |
| 4,675,476 | 6/1987 | Kobayashi | 178/18 |
| 4,675,746 | 6/1987 | Tetrick et al. | 358/296 |
| 4,678,689 | 7/1987 | Phillips | 428/13 |
| 4,687,526 | 8/1987 | Wilfert | 156/64 |
| 4,694,148 | 9/1987 | Diekemper et al. | 235/468 |
| 4,711,690 | 12/1987 | Haghiri-Tehrani | 156/309.6 |
| 4,728,983 | 3/1988 | Zwadlo et al. | 355/4 |
| 4,773,677 | 9/1988 | Plasse | 283/77 |
| 4,837,061 | 6/1989 | Smits et al. | 428/40 |
| 4,852,911 | 8/1989 | Hoppe | 283/82 |
| 4,889,749 | 12/1989 | Ohashi et al. | 428/13 |
| 4,938,830 | 7/1990 | Cannistra | 156/270 |
| 4,971,646 | 11/1990 | Schell et al. | 156/244.17 |
| 4,992,130 | 2/1991 | Vermeulen et al. | 156/307.5 |
| 4,999,065 | 3/1991 | Wilfert | 156/64 |
| 5,011,570 | 4/1991 | Ohbayashi | 156/310 |
| 5,021,318 | 6/1991 | Mayo et al. | 430/124 |
| 5,023,288 * | 6/1991 | Hirai et al. | 524/268 |
| 5,034,081 | 7/1991 | Aizawa et al. | 156/220 |
| 5,058,926 | 10/1991 | Drower | 283/109 |
| 5,066,047 | 11/1991 | Mailloux et al. | 283/86 |
| 5,073,221 | 12/1991 | Waitts et al. | 156/253 |
| 5,089,856 | 2/1992 | Landa et al. | 355/279 |
| 5,135,263 | 8/1992 | Terwel | 283/112 |
| 5,171,039 | 12/1992 | Dusek | 283/75 |
| 5,174,608 | 12/1992 | Benardelli | 283/81 |
| 5,181,745 | 1/1993 | Jacobsen et al. | 283/94 |
| 5,209,959 | 5/1993 | McNaul et al. | 428/40 |
| 5,213,648 | 5/1993 | Vermeulen et al. | 156/307.5 |
| 5,225,260 | 7/1993 | McNaul et al. | 428/40 |
| 5,229,190 | 7/1993 | Clement et al. | 428/195 |
| 5,261,987 | 11/1993 | Luening et al. | 156/235 |
| 5,281,507 | 1/1994 | Simms et al. | 430/126 |
| 5,281,799 | 1/1994 | McIntire et al. | 235/380 |
| 5,283,093 | 2/1994 | All | 428/41 |
| 5,319,475 | 6/1994 | Kay et al. | 359/2 |
| 5,362,106 | 11/1994 | Longtin | 283/109 |
| 5,362,540 | 11/1994 | Keng | 428/78 |
| 5,370,960 | 12/1994 | Cahill et al. | 430/124 |
| 5,385,803 | 1/1995 | Duff et al. | 430/138 |
| 5,393,628 | 2/1995 | Ikezue et al. | 430/59 |
| 5,399,651 * | 3/1995 | Gentle et al. | 528/15 |
| 5,458,938 | 10/1995 | Nygard et al. | 428/40 |
| 5,478,629 | 12/1995 | Norman | 428/200 |
| 5,489,356 | 2/1996 | Drower | 156/269 |
| 5,492,589 | 2/1996 | Mizuno | 156/269 |
| 5,497,771 | 3/1996 | Rosenheimer | 128/633 |
| 5,509,693 | 4/1996 | Kohls | 462/6 |
| 5,520,985 | 5/1996 | Helicher | 428/192 |
| 5,525,400 * | 6/1996 | Mawser et al. | 430/10 |
| 5,543,010 | 8/1996 | Keng | 156/285 |
| 5,573,865 | 11/1996 | Steelman et al. | 428/40.9 |
| 5,576,188 | 11/1996 | Schlaeppi et al. | 435/7.93 |
| 5,579,117 | 11/1996 | Arsenault et al. | 358/296 |
| 5,626,937 | 5/1997 | Morikawa et al. | 428/76 |
| 5,637,174 | 6/1997 | Field et al. | 156/256 |
| 5,641,374 | 6/1997 | Peterson et al. | 156/324.4 |
| 5,652,282 | 7/1997 | Baker et al. | 523/201 |
| 5,662,976 | 9/1997 | Popat et al. | 428/40.1 |
| 5,665,505 | 9/1997 | Malhotra | 430/97 |
| 5,670,015 | 9/1997 | Finestone et al. | 156/549 |
| 5,683,774 | 11/1997 | Faykish et al. | 428/40.1 |
| 5,688,738 | 11/1997 | Lu | 503/227 |
| 5,695,589 | 12/1997 | German et al. | 156/250 |
| 5,698,333 | 12/1997 | Benoit et al. | 428/516 |
| 5,700,550 | 12/1997 | Uyama et al. | 428/212 |
| 5,746,451 | 5/1998 | Weyer | 283/65 |
| 5,746,864 | 5/1998 | Reiter et al. | 156/220 |
| 5,753,352 | 5/1998 | Vanmaele et al. | 428/204 |
| 5,756,188 | 5/1998 | Reiter et al. | 428/195 |
| 5,787,186 | 7/1998 | Schroeder | 382/115 |
| 5,795,696 | 8/1998 | Malhotra | 430/124 |
| 5,807,461 | 9/1998 | Hagstrom | 156/361 |
| 5,846,900 | 12/1998 | Reiter et al. | 503/227 |
| 5,876,910 | 3/1999 | Anderson et al. | 430/527 |
| 5,891,824 | 4/1999 | Simpson et al. | 503/227 |
| 5,940,173 | 8/1999 | Tomi et al. | 356/237 |

FOREIGN PATENT DOCUMENTS

| | | |
|---|---|---|
| 2541978 | 9/1984 | (FR) . |
| 2629936 | 10/1989 | (FR) . |
| 2701668 | 8/1994 | (FR) . |
| 1 413 832 | 11/1975 | (GB) . |
| 2 221 060 | 1/1990 | (GB) . |
| 2 228 445 | 8/1990 | (GB) . |
| 2 281 535 | 3/1995 | (GB) . |
| 52-116111 | 9/1977 | (JP) . |
| 5297677 | 11/1993 | (JP) . |
| 9171278 | 6/1997 | (JP) . |
| WO83/04092 | 11/1983 | (WO) . |
| WO93/22137 | 11/1993 | (WO) . |
| WO95/06564 | 3/1995 | (WO) . |
| WO95/19892 | 7/1995 | (WO) . |
| WO96/13392 | 5/1996 | (WO) . |
| WO96/32256 | 10/1996 | (WO) . |
| WO96/34316 | 10/1996 | (WO) . |
| WO97/12284 | 3/1997 | (WO) . |
| WO97/22474 | 6/1997 | (WO) . |
| WO97/43128 | 11/1997 | (WO) . |
| 9510587 | 12/1994 | (ZA) . |

OTHER PUBLICATIONS

Paulson, B., "High Definition Printing™ Technology for Identification Card Production", *Fargo Electronics, Inc.*, pp. 1–4 (1999).

International Standard, "Identification cards—Test Methods", ISO/IEC 10373:1993, pp. 1–29.

International Standard, "ANSI Internat Doc Sec.—Identification Cards—Physical Characteristics", ISO/IEC 7810:1995, pp. 1–5.

Database WPI, Section Ch, Week 199321, Derwent Publications Ltd., London, GB; AN 1993–172336 XP002127880 & JP 05 104695 A (Dainppon Printing Co. Ltd.), Apr. 27, 1993 (Apr. 27, 1993) abstract.

* cited by examiner

ADHESIVES FOR PREPARING A MULTILAYER LAMINATE FEATURING AN INK-BEARING SURFACE BONDED TO A SECOND SURFACE

BACKGROUND OF THE INVENTION

This invention relates to adhesives for use in multilayer laminates in which at least one of the layers includes an ink-bearing surface.

There has been an interest in printing images such as photographic images onto plastic substrates. It would be particularly desirable to use liquid toner-based electrophotographic printing for this purpose because this printing technique produces high quality images.

Once the image has been printed onto the surface of the plastic substrate, it is necessary to apply a protective film over the printed ink-bearing surface. The bond strength between the protective film and the printed surface must be sufficient to resist delamination under typical use conditions.

SUMMARY OF THE INVENTION

In one aspect, the invention features an adhesive composition that includes the reaction product of: (a) a polyester-based polyurethane; (b) an epoxy resin; (c) an epoxy-functional silane; and (d) an isocyanate-functional compound. The adhesive compositions are useful for preparing multilayer laminates in which a major surface of a first polymeric substrate is bonded to a major surface of a second polymeric substrate through the adhesive composition. One or both of those major surfaces includes an ink-bearing image.

The adhesive compositions exhibit good adhesion (as measured by the 180 degree peel strength) to both ink-bearing polymeric substrates and non-ink bearing polymeric substrates. The compositions are particularly useful where the ink is an electrophotographic ink. Examples of suitable electrophotographic inks include polymers having a Tg no greater than about 30° C., while in other embodiments the ink includes a polymer having a Tg greater than about 30° C.

One example of a suitable ink is derived from gel organosol-containing, liquid toner compositions described, e.g., in Baker et al., U.S. Pat. No. 5,652,282 and Baker et al., U.S. Pat. No. 5,698,616, each of which is hereby incorporated by reference. These toners include (a) a carrier liquid (e.g., an aliphatic hydrocarbon carrier liquid having a Kauri-Butanol number less than 30) and (b) a (co)polymeric steric stabilizer having a molecular weight greater than or equal to 50,000 Daltons and a polydispersity less than 15 covalently bonded to a thermoplastic (co)polymeric core that is insoluble in the carrier liquid. The core preferably has a Tg no greater than about 30° C. The toner may further include a colorant and a charge director. Also suitable are non-gel organosol-containing liquid toner compositions described, for example, in Baker et al., U.S. Pat. No. 5,886,067, hereby incorporated by reference.

Another example of a suitable ink is derived from liquid toners described in Landa et al., U.S. Pat. No. 4,794,651; Landa et al., U.S. Pat. No. 4,842,974; Landa et al., U.S. Pat. No. 5,047,306; Landa et al., U.S. Pat. No. 5,047,307; Landa et al., U.S. Pat. No. 5,192,638; Landa et al., U.S. Pat. No. 5,208,130; Landa et al., U.S. Pat. No. 5,225,306; Landa et al., U.S. Pat. No. 5,264,313; Landa et al., U.S. Pat. No. 5,266,435; Landa et al., U.S. Pat. No. 5,286,593; Landa et al., U.S. Pat. No. 5,346,796; Landa et al., U.S. Pat. No. 5,407,771 and Landa, WO92/17823 published Oct. 15, 1992 entitled "Polymer Blends," each of which is hereby incorporated by reference.

The compositions are also useful with inks such as ink jet inks and lithographic inks. Any of these inks may be used alone or in combination with each other. For example, the ink-bearing surface may include electrophotographically printed areas featuring an electrophotographic ink and offset printed areas featuring a lithographic ink. Preferably, however, all the printed areas of the laminate are electrophotographically printed areas featuring an electrophotographic ink.

The adhesive compositions exhibit good adhesion to a number of polymeric substrates. In one preferred embodiment, the adhesive is used to bond a rigid core layer to a flexible overlay film, where at least one of these materials includes an ink-bearing surface. Preferably, at least one of the substrates is substantially transparent to permit viewing of the printed image on the ink-bearing surface.

Examples of suitable polymeric substrates are selected from the group consisting of polyvinyl chloride, vinyl chloride-vinyl acetate copolymers, polyesters, polyolefins, polycarbonates, and combinations thereof. Also suitable are microporous substrates such as Teslin™ films commercially available from PPG, Inc. of Pittsburgh, Pa. One preferred construction includes a polyvinyl chloride substrate adhesively bonded to a substantially transparent polyester overlay film.

The adhesive compositions are also useful for preparing laminated articles having more than two substrates. For example, the article may include a core substrate having a pair of opposed major surfaces, each of which is bonded to a separate overlay film. Such constructions are particularly useful for articles having printed images on two different surfaces.

In a second aspect, the invention features a lamination process for preparing the above-described articles. The ink-bearing image preferably is performed according to an electrophotographic imaging process that includes:

(i) charging the surface of an electrophotographic photoreceptor;

(ii) imagewise exposing the charged surface of the photoreceptor to radiation to dissipate charge in selected areas and thereby form a latent image on the photoreceptor surface;

(iii) contacting the latent image with a toner to form a toned image; and (iv) transferring the toned image to the major surface of the first polymeric substrate.

The toner preferably is a liquid toner. Preferred liquid toners, in turn, include a film-forming polymer. In some embodiments, the film-forming polymer has a Tg no greater than about 30° C., while in other embodiments the film-forming polymer has a Tg greater than about 30° C. Following lamination, the article may subjected to a number of operations, including slitting, cutting, hole punching and drilling, foil stamping, sewing and grommeting, foil stamping, perforation, folding, surface texturing, and the like.

Other features and advantages of the invention will be apparent from the following description of the preferred embodiments thereof, and from the claims.

DETAILED DESCRIPTION

The invention will now be described further by way of the following examples.

The black, positive-acting, film-forming, electrophotographic ink used in the examples was prepared at an organosol/pigment ratio of 6 following the procedure described in Example 40 of U.S. Pat. No. 5,652,282 modified as follows.

The gel organosol prepared according to the procedure of Example 22 of U.S. Pat. No. 5,652,282 was mixed using a Silverson mixer (Model L2R, Silverson Machines, Ltd.) operated at the lowest speed setting. After mixing for five minutes, 1912 g of the homogenized organosol at 16.14% (w/w) solids in NORPAR 12 were combined with 1031 g of NORPAR 12 (Exxon Chemical Co., Houston, Tex.), 51 g of MONARCH 120 carbon black (Cabot Corp., Billerica, Mass.), and 6.08 g of Zirconium HEX-CEM (OMG Chemical Company, Cleveland, Ohio) in a 4.0 liter polyethylene container. This mixture was then milled in ten vertical bead mills, each having a capacity of 0.5 liter (Model 6TSG-1/4, Aimex Co. Ltd., Tokyo, Japan) by placing 300 g of millbase and 390 g of 1.3 mm diameter Potters glass beads (Potters Industries, Inc., Parsippany, N.J.) in each mill. Each mill was operated at 2,000 rpm for 1.5 hours without cooling water circulating through the cooling jacket of the milling chamber.

A portion of the 12% (w/w) solids toner concentrate thus formed was diluted to approximately 3% (w/w). This dilute toner sample exhibited the following properties, as determined using the test methods described in U.S. Pat. No. 5,652,282:

Number Mean Particle Size: 0.261 micron

Bulk Conductivity: 149 picoMhos/cm

Percent Free Phase Conductivity: 5%

Dynamic Mobility: 0.0402 micron-cm/[volt-second]

This 3% toner was tested on the toner plating apparatus described in U.S. Pat. No. 5,652,282. The reflection optical density (ROD) was greater than 1.47 at plating voltages greater than 400 volts.

EXAMPLES

Example 1

An adhesive coating solution was prepared by adding methyl ethyl ketone (201 g), Epon 1007F epoxy resin (143 g of a 20 wt. % solution in methyl ethyl ketone, available from Shell Chemical Co.), epoxycyclohexylethyl trimethoxy silane (14.4 g, available from Aldrich Chemical Co.), and Vestanat T1890E isocyanate (215 g of a 20 wt. % solution in methyl ethyl ketone, available from Creanova) to 1428 g of a solution of Desmocoll 8634 polyurethane resin (15 wt. % in methyl ethyl ketone, available from Bayer Chemical Co.). The solution was applied to Mellinex 454 polyester film (0.92 mil, available from Dupont) at a wet coating coverage of approximately 375 g/square meter and dried to give an adhesive-coated film. The dry thickness of the adhesive layer was 1.0 mil.

The adhesive portion of the film was area printed using a liquid toner-based, black, positive-acting, film-forming, electrophotographic ink (prepared as described above) to a net optical density of 1.6. The net optical density is equal to the white light optical density minus the white light optical density of unprinted film, measured in reflectance mode with a Macbeth densitometer. The net optical density corresponded to an ink net optical density of 1.3 for a paper substrate printed under identical conditions.

After printing, the adhesive-coated film was laminated to a white polyvinyl chloride substrate. Lamination took place between two heated rollers (roll surface temperature= 135–138EC) at a rate of 0.4 inches/second to give a laminated, printed article. The article was cut into strips measuring one inch wide and the 180 degree peel force required to cause delamination was measured 15 minutes after the lamination step using an Instron Tester (Model 5542). The crosshead speed was 12 inches/minute. The peel force was determined to be 4.5 pounds/inch (7.9 N/cm).

In a separate experiment, unprinted adhesive film was laminated to an identical white polyvinyl chloride substrate in an identical manner. The peel force was determined to be approximately 12 pounds/inch (21 N/cm), which resulted in tearing of the polyester film.

Example 2

A laminated article was prepared following the procedure of Example 1 except that lamination took place 30 minutes after printing. The peel strength was determined to be 1.9 pounds/inch (3.4 N/cm). The experiment was then repeated except that subsequent to the printing step, the printed polyester film was heated at 100° C. for 2 minutes and then laminated after a total of thirty minutes had elapsed since the printing step. The peel force, measured approximately five minutes after the lamination, was 2.4 pounds/inch (4.2 N/cm).

Example 3

The procedure of Example 1 was followed except that the adhesive was prepared by combining 15 parts Desmocoll 530, 85 parts methyl ethyl ketone, 3 parts Vestanat T1890E isocyanate, 1 part epoxycyclohexylethyl trimethoxy silane, and 2 parts Epon 1007F epoxy resin. The resulting article exhibited a peel force, measured as described in Example 1, of 4.0 pounds/inch (7.0 N/cm). The failure mode was ink splitting.

In a separate experiment, unprinted adhesive-coated polyester film was laminated to an identical white polyvinyl chloride substrate in an identical manner. The resulting article was stored for two weeks at 60° C. and 100% relative humidity, after which the peel strength was measured and determined to be 10 pounds/inch (17.6 N/cm).

Other embodiments are within the following claims.

What is claimed is:

1. An article comprising:
   (a) a first polymeric substrate having a major surface;
   (b) a second polymeric substrate having a major surface, wherein one of said major surfaces comprises an ink-bearing image; and
   (c) an adhesive bonding said major surface of said first polymeric substrate to said major surface of said second polymeric substrate,
   said adhesive comprising the reaction product of:
      (i) a polyester-based polyurethane;
      (ii) an epoxy resin;
      (iii) an epoxy-functional silane; and
      (iv) an isocyanate-functional compound.

2. An article according to claim 1 wherein both of said major surfaces comprise an ink-bearing image.

3. An article according to claim 1 wherein said ink-bearing image comprises an electrophotographic ink.

4. An article according to claim 1 wherein said ink-bearing image comprises a polymer having a Tg no greater than about 30° C.

5. An article according to claim 1 wherein said ink-bearing image comprises a polymer having a Tg greater than about 30° C.

6. An article according to claim 1 wherein said first polymeric substrate comprises a rigid core layer and said second polymeric substrate comprises a flexible overlay film.

7. An article according to claim 1 wherein one of said polymeric substrates is substantially transparent.

8. An article according to claim 1 wherein said polymeric substrates are selected from the group consisting of polyvinyl chloride, vinyl chloride-vinyl acetate copolymers, polyesters, polyolefins, polycarbonates, and combinations thereof.

9. An article according to claim 1 wherein one of said polymeric substrates comprises a polyester.

10. An article according to claim 1 wherein one of said polymeric substrates comprises polyvinyl chloride.

11. An article according to claim 1 wherein said first polymeric substrate comprises polyvinyl chloride and said second polymeric substrate comprises a polyester.

12. An article according to claim 1 wherein one of said polymeric substrates comprises a microporous substrate.

13. A process for preparing an article comprising:
  (a) combining a first polymeric substrate having a major surface and a second polymeric substrate having a major surface with a composition comprising:
    (i) a polyester-based polyurethane;
    (ii) an epoxy resin;
    (iii) an epoxy-functional silane; and
    (iv) an isocyanate-functional compound, such that said composition is intermediate said major surfaces of said polymeric substrates, wherein one of said major surfaces comprises an ink-bearing image; and
  (b) laminating said major surfaces of said first and second substrates together through said composition to form said article.

14. A process according to claim 13 comprising forming said ink-bearing image according to an electrophotographic imaging process comprising:
  (i) charging the surface of an electrophotographic photoreceptor;
  (ii) imagewise exposing the charged surface of said photoreceptor to radiation to dissipate charge in selected areas and thereby form a latent image on said photoreceptor surface;
  (iii) contacting said latent image with a toner to form a toned image; and
  (iv) transferring said toned image to said major surface of said first polymeric substrate.

15. A process according to claim 14 wherein said toner comprises a liquid toner.

16. A process according to claim 15 wherein said liquid toner comprises a film-forming polymer.

17. A process according to claim 16 wherein said film-forming polymer has a Tg no greater than about 30° C.

18. A process according to claim 16 wherein said film-forming polymer has a Tg greater than about 30° C.

\* \* \* \* \*